United States Patent [19]

Chalfont et al.

[11] 3,879,362

[45] Apr. 22, 1975

[54] POLYMERISATION PROCESS

[75] Inventors: Geoffrey Reginald Chalfont; Ronald Alfred Crump, both of Horsham; Prem Sagar Thukral, Carshalton Beeches, all of England

[73] Assignee: BP Chemical International Limited, London, England

[22] Filed: June 8, 1973

[21] Appl. No.: 368,269

[30] Foreign Application Priority Data

June 12, 1972 United Kingdom............... 27245/72

[52] U.S. Cl......... 260/88.2 R; 252/431 R; 252/458; 252/469; 260/94.9 D; 260/94.9 E
[51] Int. Cl. ....... C08f 1/66; C08f 3/06; C08f 15/04
[58] Field of Search ..... 260/94.9 D, 94.9 E, 88.2 R; 252/431 R, 458, 469

[56] References Cited
UNITED STATES PATENTS

| | | | |
|---|---|---|---|
| 2,825,721 | 3/1958 | Hogan et al. | 260/94.9 D |
| 3,349,067 | 10/1967 | Hill | 260/94.9 D |
| 3,485,771 | 12/1969 | Horvath | 260/94.9 D |
| 3,622,521 | 11/1971 | Hogan et al. | 260/94.9 D |
| 3,625,864 | 12/1971 | Horvath | 260/94.9 D |
| 3,780,011 | 12/1973 | Pullukat et al. | 260/94.9 D |

Primary Examiner—Joseph L. Schofer
Assistant Examiner—A. Holler
Attorney, Agent, or Firm—Brooks Haidt & Haffner

[57] ABSTRACT

Process for polymerising ethylene using a catalyst prepared by (1) heating together a titanium compound and a support material selected from silica, alumina, zirconia, thoria or composites thereof and (2) heating the product from (1) with a chromium compound at a temperature in the range 350°–550°C to produce an active catalyst.

20 Claims, No Drawings

POLYMERISATION PROCESS

This invention relates to a process for the production of polyolefins by a catalysed polymerisation and to the catalyst so employed.

According to the present invention the process for polymerising ethylene or a mixture of ethylene and at least one other 1-olefin comprises contacting the monomeric material under polymerisation conditions with a catalyst prepared by a process comprising (I) heating together a support material comprising silica, alumina, zirconia, thoria or composites thereof and a titanium compound as hereinafter defined at a temperature in the range 150°–1,200°C and (II) incorporating in the product from (I) under substantially anhydrous conditions a chromium compound and heating at a temperature in the range 100° to 1,200°C to produce an active polymerisation catalyst.

The invention further provides a process for the preparation of a polymerisation catalyst comprising (I) heating together a support material comprising silica, alumina, zirconia, thoria or composites thereof and a titanium compound as hereinafter defined at a temperature in the range 150°–1,200°C and (II) incorporating in the product from (I) under substantially anhydrous conditions a chromium compound and heating at a temperature in the range 100° to 1,200°C to produce an active polymerisation catalyst.

The monomeric material used in the process of the present invention may consist of ethylene as the sole monomer when an ethylene homopolymer is desired or mixtures of ethylene with other 1-olefins for example propylene, 1-butene, 1-pentene, 1-hexene, 4-methyl-1-pentene, 1,3-butadiene or isoprene when it is desired to make copolymers. Preferably not more than about 25 weight % (based on the total monomeric material) of these comonomers are added to the ethylene.

The support material used in the process of the present invention is preferably silica. Examples of preferred types of silica are microspheroidal silica, silica gel, and high pore volume silica gel, for example silica gels of the type described in French Pat. Nos. 2,015,128, 2,015,130 and Belgian Pat. 741,437. Silicas having a pore volume of at least 0.5 ml/g and a surface area of the range 200 to 600 m²/g are particularly preferred.

The term "titanium compound" is used throughout this specification to denote a compound or compounds selected from those represented by the formulae
  a. $(R')_n Ti (OR')_m$;
  b. $(RO)_m Ti(OR')_n$;
  c. $Ti X_4$;
  d. $TiO_2$;
  e. titanium acetyl acetonate compounds and f. alkanolamine titanates wherein $m$ is 1, 2, 3 or 4; $n$ is 0, 1, 2 or 3; $m + n = 4$;

the R group is selected from alkyl, aryl, cycloalkyl and combinations thereof, for example aralkyl and alkaryl, each group having one to 12 carbon atoms; R' is selected from the group consisting of R, cyclopentadienyl and alkenyl, for example ethenyl, propenyl and isopropenyl each group having one to 12 carbon atoms; X is halogen preferably chlorine; when more than one R (or R') group occurs in the titanium compound the groups can be the same or different. Titanium compounds represented by the formula $(RO)_4 Ti$ are preferred, particularly the alkyl compounds having from one to six carbon atoms in each alkyl group for example tetraethyl titanate and tetraisopropyltitanate. The titanium acetyl acetonate compound can be, for example, titanium diacetylacetonate di-isopropylate, titanium dichloro diacetyl acetonate or the so called "titanium acetyl acetonate," "titanyl acetyl acetonate." The alkanolamine titanate can be for example triethanolamine titanate.

The quantity of titanium compound used in the process of the present invention is suitably in the range 0.5 to 8.0% based on the weight of the support material, and preferably in the range 2.0 to 6.0%. It is believed that during the first step of the catalyst preparation of the present invention the titanium compound is chemisorbed by the support material. This is supported by the fact that when an excess of a volatile titanium compound such as isopropyl titanate is refluxed in the presence of the support material (e.g. silica) and then the reflux condenser is removed, a quantity of the titanium compound does not volatilise. This quantity is in general found to be approximately constant for a given support material and titanium compound.

Most preferably the quantity of titanium compound used in the present invention is the maximum amount that can be chemisorbed by the support material.

The chromium compound can be any substantially anhydrous chromium compound capable of forming in conjunction with the support material an active catalyst for ethylene polymerisation. Examples of such chromium compounds are chromium salts such as chromic sulphate and chromic nitrate; chromium oxides and oxycompounds such as chromic oxide $(CrO_3)$ and chromyl chloride; chromates such as ammonium chromate and tertiary butyl chromates (e.g. ditert. butyl chromate); and organic chromium compounds such as chromium acetyl acetonate and bis(cyclopentadienyl) chromium. The compound ditertiarybutyl chromate is preferred.

The total chromium content of the catalyst used in the process of the present invention is suitably in the range 0.02 to 30 weight % and preferably 0.1 to 5.0 weight % based on the total weight of catalyst.

Suitably the support material used in the process of the present invention is substantially free from water or other present invention is substantially free from water or other deleterious substances capable of reacting with the titanium compound or poisoning the catalyst. The support material is preferably pre-dried for example by heating in an oven or a stream of dry air at a temperature in the range 50° to 800°C.

Suitably the titanium compound is mixed in the absence of moisture with the support. This may be achieved in any convenient manner, for example by dry mixing, by ball milling, by dissolving the titanium compound in a suitable inert non-aqueous solvent, e.g. petroleum ether, mixing the solution with the support and evaporating off the solvent, or by incorporating the titanium compound as solid, liquid or vapour into a fluidised bed of the support material for example by passing the vapour of the titanium compound into the fluidising gas.

The support material and the titanium compound are heated together at a temperature in the range 150°–1,200°C and preferably 400°–1,000°C, most preferably 500°–900°C for a period of time which can range from a few minutes to several hours. The heating may be carried out for example by heating the mixture in a fluidised bed through which dry gas (e.g. air) is passing, or by fluidising a bed of the heated support material using a mixture of dry gas and vapour of the titanium compound.

The chromium compound can be incorporated in the support material from the first stage heating (I) by any suitable anhydrous technique, for example dry mixing, dissolution of the chromium compound in a suitable inert non-aqueous solvent, ball milling or in the case where a volatile chromium compound is used (e.g. $CrO_2Cl_2$) the compound may if desired be vapourised and passed into the titanated support or carried therein in a stream of dry gas (e.g. air, nitrogen or oxygen).

The activation procedure carried out in the second stage (II) of the catalyst preparation comprises heating the catalyst at a temperature in the range 100°–1,200°C, preferably in the range 200° to 900°C most preferably in the range 200° to 700°C so that an active polymerisation catalyst is produced. It will be appreciated that if the sintering temperature of the support is below 1,200°C it will be necessary to keep the activation temperature below the sintering temperature in order to produce an active polymerisation catalyst. It is ordinarily preferred that the heating be conducted in a stream of dry gas, e.g. air. The duration of the heating is suitably a few minutes to several hours, for example one-half to 12 hours. In general, lower activation temperatures e.g. 200°–400°C tend to produce polymers having higher melt indices.

The polymerisation techniques i.e., reaction conditions, recovery techniques, apparatus etc. employed in the process of the present invention can be for example in accordance with the techniques employed in the well known Phillips processes. Phillips polymerisation processes are described for example in British Pat. Specification Nos. 790,195; 804,641; 853,414; 886,784 and 899,156. The polymerisation reaction can be carried out for example under reaction conditions such that the polymer is formed in solution in a suitable solvent (the so-called Phillips 'solution form' process) or so that the polymer is formed as solid particles suspended or fluidised in a diluent which can be liquid or gaseous (so called 'particle form' processes). In the gas-phase polymerisation the diluent can be the gaseous monomer. Normally, the gaseous diluent is recycled and cooled to control the temperature of the polymerisation reaction.

It is preferred to carry out the polymerisation or copolymerisation reaction under particle form process conditions and under these conditions the diluent is preferably a liquid diluent (see for example British Pat. Specification Nos. 853,414; 886,784 and 899,156).

Where a liquid diluent is employed in the polymerisation or copolymerisation reaction, it can be any hydrocarbon which is chemically inert and non-deleterious to the catalyst under the reaction conditions. Generally the diluent is selected from the groups consisting of paraffins and cycloparaffins having from 3–30 carbon atoms per molecule. Suitable diluents include for example isopentane, isobutane, and cyclohexane. When the process of the present invention is operated under particle form process conditions in a liquid diluent, the preferred liquid diluent is isobutane. Liquid diluents, when used, are generally present in sufficient amounts so that the concentration of monomeric material in the total hydrocarbon feed is of the order of 2–10 wt % although concentrations outside this range can be employed if desired.

For further details of particle form process conditions and other process conditions which can be employed in the process of the present invention reference may be made to the aforementioned British Patent Specifications.

The polymerisation pressure is preferably high enough to maintain the diluent, when a liquid diluent is used, in the liquid phase and to ensure that the monomeric material if not liquefied under the conditions used, is dissolved in the liquid phase in sufficient amount. Pressures of the order of 50 to 700 pounds per square inch (psi) are generally adequate for this purpose. In general the reaction pressure can vary from approximately atmospheric to as high as several thousands psi. The residence or reaction time can vary from a few minutes to several hours and is generally in the range 15 minutes to 3 hours.

The polymerisation reaction can be conducted for example by contacting the monomeric material or the monomer-containing hydrocarbon feed with a fixed bed of the catalyst, with a gravitating bed of the catalyst, with the catalyst suspended in finely divided particulate form in a diluent and being maintained in suspension by agitation; or by use of a fluidised bed technique.

If desired, the polymerisation can be conducted in the presence of hydrogen gas to increase the melt index of the produced polymer. In general, the higher the partial pressure of hydrogen in the reaction zone the lower becomes the molecular weight of the produced polymer.

Methods of recovering the product polyolefin are well known in the art and for further description of recovery techniques reference may be made to the aforementioned British Patent Specifications.

The process of the present invention can be used to make polyethylene and copolymers thereof having a wide range of melt indices. It is particularly useful for the production of high melt index polyethylene.

The invention is illustrated by the following Examples.

In the Examples the melt index (MI) and high load melt index (HLMI) were determined according to ASTM method 1238 using 2.16 Kg and 21.6 Kg loads respectively. The units are grammes per 10 minutes. The melt index ratio is HLMI/MI.

EXAMPLE 1

A silica support, commercially available from W. R. Grace & Co., and known as 952 silica, was impregnated with a petroleum-ether solution of titanium tetraisopropylate (isopropyl titanate). The 952 silica had previously been dried at 150°C. After removal of the solvent the titanium modified silica was heated at 800°C for 3 hours in a stream of dry air.

The solution obtained from addition of 1.2g of $CrO_3$ to 6.0 mls of t-butyl alcohol in 80 mls of petroleum ether was added to an agitated petroleum ether slurry containing 60 g of the predried titanium modified silica. The solvent was then removed by distillation.

The catalyst was then heated at 450°C for approximately 5 hours in a stream of dry air. The titanium and chromium contents of this catalyst were 5.0 and 0.94 w/w % respectively. The catalyst (0.120 g.) was then charged to a nitrogen purged one-half gallon autoclave. Isobutane (1,000 mls) was then charged to the autoclave and ethylene admitted to a pressure of 600 p.s.i.

Ethylene was supplied to maintain constant pressure and the reaction temperature controlled at 96°C for 60 mins. The yield of polyethylene was 455 g. and productivity 3,800 g. polymer/g catalyst/hour. The melt index properties of the polymer was measured after treatment with antioxidant and homogenising on a roll mill for 5 at 150°C. The MI and Melt Index Ratio of the polymer were 0.70 and 127 respectively.

EXAMPLE 2

The catalyst, impregnated with titanium and chromium as in Example 1, was heated at 350°C for approximately 5 hours in a stream of dry air. The titanium and chromium contents of this catalyst were 4.9 and 0.88 w/w % respectively. The catalyst (0.126 g) was charged to a nitrogen purged one-half gallon autoclave. Isobutane (1,000 mls) was then charged to the autoclave and ethylene admitted to a pressure of 600 p.s.i. Ethylene was supplied to maintain constant pressure and the reaction temperature controlled at 105°C for 65 mins. The yield of polyethylene was 365 g. and the productivity 2,900 g. polymer/g catalyst.

The polymer after treatment with antioxidant and homogenising on a roll mill for 5 mins. at 150°C gave a Melt Index of 30.

EXAMPLE 3

A titanium modified silica, prepared as in Example 1, was heated at 860°C for 3 hours in a stream of dry air. The titanium modified silica was further impregnated with chromium, as in Example 1, and the final catalyst heated at 500°C for approximately 5 hrs in a stream of dry air. The titanium and chromium contents of this catalyst were 5.2 and 0.95 w/w % respectively. The catalyst (0.134 g) was charged to a nitrogen purged one-half gallon autoclave. Isobutane (1,000 mls) was then charged to the autoclave and ethylene admitted to a pressure of 600 p.s.i. Ethylene was supplied to maintain constant pressure and the reaction temperature controlled at 98°C for 50 mins. The yield of polyethylene was 490 g and the productivity 3,660 g polymer/g catalyst.

The polymer after treatment with antioxidant and homogenising on a roll mill for mins at 150°C gave a Melt Index of 0.74.

EXAMPLE 4

The catalyst (0.140 g) employed in Example 3, was charged to a nitrogen purged one-half gallon autoclave. Isobutane (1,000 mls) was then charged to the autoclave and ethylene admitted to a pressure of 600 p.s.i. Ethylene was supplied to maintain constant pressure and the reaction temperature controlled at 98°C for 65 mins. During the polymerisation reaction a total of 120 p.s.i. of hydrogen was charged to the autoclave. The yield of polyethylene was 450 g and the productivity 3,220 g polymer/g catalyst.

The polymer after treatment with antioxidant and homogenising on a roll mill for 5 mins at 150°C gave a Melt Index of 10.7.

EXAMPLE 5

A titanium modified silica, prepared as in Example 1 was heated at 860°C for 3 hrs in a stream of dry air. The titanium modified silica was further impregnated with chromium as in Example 1, and the final catalyst heated at 300°C for approximately 5 hrs in a stream of dry air. The titanium and chromium contents of this catalyst were 3.3 and 0.81 w/w % respectively. The catalyst (0.107g) was charged to a nitrogen purged one-half gallon autoclave. Isobutane (1,000 mls) was then charged to the autoclave and ethylene admitted to a pressure of 600 psi. Ethylene was supplied to maintain constant pressure and the reaction temperature controlled at 104°–105°C for 75 mins. The yield of polyethylene was 335g and the productivity 3,130 g polymer/g catalyst.

The polymer after treatment with antioxidant and homogenising on a roll-mill for 5 mins at 150°C gave a Melt Index of 93.0.

EXAMPLE 6

A titanium modified silica support, prepared as in Example 1, was heated at 800°C for 3 hours in a stream of dry air. The titanium modified silica was further impregnated with chromium, as in Example 1, and the final catalyst activated by heating at 450°C for approximately 5 hours in a stream of dry air. The titanium and chromium contents of this catalyst were 4.8 and 0.19 w/w % respectively. The catalyst (0.111g) was charged to a nitrogen purged 1 gallon autoclave containing 15g polyethylene prepolymer and equipped with a cooling coil and stirrer suitable for gas phase polymerisation of ethylene. Hydrogen was introduced to a pressure of 50 psi, then ethylene until the reactor pressure was 600 psi. Ethylene was supplied to maintain constant pressure and the reaction temperature was controlled at 105°C for 60 mins. The yield of polyethylene excluding prepolymer was 365g and the productivity 3,290 g polymer/g catalyst.

The polymer after treatment with antioxidant and homogenising on a roll mill for 5 minutes at 150°C gave a Melt Index of 10.0.

EXAMPLE 7–14

A series of catalysts according to the present invention were prepared by impregnating "952"silica previously dried at 150°C with a petroleum ether solution of the titanium compound (containing about 10% w/w of the titanium compound). After removal of the solvent the titanium modified silica was heated for 3 hours in a stream of dry air at the temperature indicated in Table 1. The titanium modified silica was then treated with a quantity of tertiary butyl chromate dissolved in petroleum ether (the quantity used in each case being sufficient to give the w/w % chromium indicated in the Table). The solvent was then distilled off. The catalyst was then activated by heating (at the temperature indicated in the Table) for approximately 5 hours in a stream of dry air, The catalyst was then used to polymerise ethylene using similar techniques to those describe in Example 1. The reaction temperature and melt index of the polymer after treatment with antioxidant and homogenising are shown in the Table.

EXAMPLE 15 (Comparative)

A silica supported chromium oxide catalyst containing 1% chromium oxide (commercially available from W. R. Grace & Co. as "MS 969") was activated by heating in a stream of dry air for 5 hours. The catalyst was used to polymerise ethylene using the techniques described in Example 1. The melt index of the produced polymer is given in the Table.

TABLE 1

| Example | Titanium Compound | Ti(w/w%) | Thermal Treatment Ti modified Silica | Cr(w/w %) | Thermal Treatment of Final Catalyst | Reaction Temp °C | MI |
| --- | --- | --- | --- | --- | --- | --- | --- |
| 7 | Isopropyl Titanate | 5.0 | 860°C | 0.88 | 350°C | 100 | 14.8 |
| 8 | N-butyl Titanate | 4.7 | 800°C | 0.86 | 450°C | 103 | 1.2 |
| 9 | Isobutyl Titanate | 4.8 | 800°C | 0.19 | 450°C | 105 | 1.8 |
| 10 | Poly-N-butyltitanate | 5.7 | 860°C | 0.89 | 350°C | 100 | 7.1 |
| 11 | Titanium diacetylacetonate di-isopropylate | 4.55 | 860°C | 1.07 | 350°C | 97–98 | 6.6 |
| 12 | Titanium dichloro-diacetylacetonate | 4.3 | 860°C | 0.97 | 350°C | 100 | 0.1 |
| 13 | Titanium Tetrachloride | 4.2 | 800°C | 0.80 | 400°C | 100 | 0.19 |
| 14 | Triethanolamine Titanate | 4.5 | 860°C | 0.87 | 350°C | 102 | 3.5 |
| 15 | MS 969 1.0% Cr. | Catalyst activated at 800°C | | | | 107 | 0.1 |

The antioxidant employed in all the Examples was a mixture of equal parts by weight of dilauryl 1-3,3-thiodipropionate and 2,6-ditertiary-butyl-p-cresol. The treatment with antioxidant consisted in stirring the polymer powder with a 0.3% solution of the mixed antioxidants in acetone (sufficient solution being added to saturate the polymer), filtering off the polymer and drying.

We claim:

1. A process for the preparation of a polymerisation catalyst comprising (I) heating together a support material comprising silica, alumina, zirconia or thoria or composites therof and a titanium compound at a temperature in the range 150°–1,200°C and (II) incorporating in the product from (I) under substantially anhydrous conditions a chromium compound and heating at a temperature in the range 100°–1,700°C to produce an active polymerisation catalyst.

2. A process according to claim 1 wherein the support material is silica.

3. A process according to claim 2 wherein the silica has a surface area of 200 to 600 meters$^2$g$^{-1}$.

4. A process according to claim 2 wherein the pore volume of the silica is at least 0.5 ml/g.

5. A process according to claim 1 wherein the titanium compound is a tetra-alkyl titanate.

6. A process according to claim 5 wherein the titanium compound is tetraethyl or tetraisopropyl titanate.

7. A process according to claim 1 wherein the quantity of titanium compound is in the range 2.0 to 6.0 wt % based on the weight of the support material.

8. A process according to claim 1 wherein the quantity of titanium compound is the maximum amount that can be chemisorbed by the support material.

9. A process according to claim 1 wherein the chromium compound is ditertiarybutyl chromate.

10. A process according to claim 1 wherein the quantity of chromium in the catalyst is in the range 0.25 to 5.0 weight % based on the total weight of the catalyst.

11. A process according to claim 1 wherein the titanium compound is incorporated into the support material by adding it to a fluidised bed of the support material.

12. A process according to claim 11 wherein the titanium compound is passed as vapour into the fluidising gas.

13. A process according to claim 1 wherein the first stage heating (I) is carried out a temperature in the range 500°–900°C.

14. A process according to claim 1 wherein the second stage heating is carried out at a temperature at least 200°C.

15. A process according to claim 1 wherein the second stage heating is carried out at a temperature in the range 200°–400°C.

16. A process for polymerising ethylene or a mixture of ethylene and at least one other 1-olefin comprising contacting monomeric material under polymerisation conditions with a catalyst prepared by a process comprising (I) heating together a support material comprising silica, alumina, zirconia, thoria or composites thereof and a titanium compound at a temperature in the range 150°–1,200°C and (II) incorporating in the product from (I) under substantially anhydrous conditions a chromium compound and heating at a temperature in the range 100° to 1,200°C to produce an active polymerisation catalyst.

17. A process according to claim 16 wherein the polymerisation conditions are such that the polymer is formed as solid particles suspended in a liquid hydrocarbon diluent.

18. A process according to claim 16 wherein the polymerisation is carried out in the presence of hydrogen gas.

19. A process according to claim 16 wherein the polymerisation is carried out in the gas phase.

20. A process according to claim 1, wherein said heating of a support material and titanium compound in stage I is carried out at a temperature in the range of 500°–900°C., and the heating in stage II after incorporating a chromium compound is carried out at a temperature in the range of 200°–400°C.

* * * * *

UNITED STATES PATENT OFFICE
CERTIFICATE OF CORRECTION

PATENT NO. : 3,879,362
DATED : April 22, 1975
INVENTOR(S) : GEOFFREY REGINALD CHALFONT, RONALD ALFRED CRUMP, and PREM SAGAR THUKRAL It is certified that error appears in the above-identified patent and that said Letters Patent are hereby corrected as shown below:

Col. 2, line 42, cancel the word "or" at the end of the line;
line 43, cancel the entire line;

Col. 7, claim 1, line 31, correct the spelling of "ther<u>e</u>of"

claim 1, line 35, 1,700°C should read --700°C--

Signed and Sealed this nineteenth Day of August 1975

[SEAL]

Attest:

RUTH C. MASON
Attesting Officer

C. MARSHALL DANN
Commissioner of Patents and Trademarks